United States Patent
Ozaki

(10) Patent No.: US 7,536,010 B2
(45) Date of Patent: May 19, 2009

(54) EXCHANGE SYSTEM, BUTTON TELEPHONE SET AND EXCHANGE

(75) Inventor: Takahiro Ozaki, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 501 days.

(21) Appl. No.: 11/476,797

(22) Filed: Jun. 29, 2006

(65) Prior Publication Data

US 2007/0071178 A1    Mar. 29, 2007

(30) Foreign Application Priority Data

Jun. 29, 2005    (JP)    ............... 2005-189983

(51) Int. Cl.
H04M 1/00    (2006.01)
H04M 1/24    (2006.01)
H04M 3/08    (2006.01)
H04M 3/12    (2006.01)
H04M 7/00    (2006.01)
H04M 9/00    (2006.01)

(52) U.S. Cl. .................. 379/433.06; 379/29.1; 379/219

(58) Field of Classification Search ................ 379/1.01, 379/29.01, 29.1, 32.01, 33, 190, 191, 387.01, 379/419, 428.03, 433.06, 219, 222.01, 221.03; 455/554.1, 555

See application file for complete search history.

(56) References Cited

U.S. PATENT DOCUMENTS 5,737,390 A    4/1998    Mano

FOREIGN PATENT DOCUMENTS

| JP | 03-046448 | 2/1991 |
| JP | 07-095638 | 4/1995 |
| JP | 2003-046673 | 2/2003 |

Primary Examiner—Tuan D Nguyen
(74) Attorney, Agent, or Firm—Pillsbury Winthrop Shaw Pittman, LLP

(57) ABSTRACT

According to one embodiment, a button telephone set, comprising function keys equipped with light emitting devices, respectively, display device which displays character information, failure information receiving unit which receives data notified from the exchange, display determining unit which determines display types of the function keys from types of the received data, light emitting device control unit which display-controls the light emitting devices of the corresponding function keys in response to an instruction from the display determining unit, display device control unit which performs a data display onto the display device in accordance with the instruction from the display determining unit, key operation determining unit which determines depressed states of keys of the button telephone sets including the function keys, and key operation transmission unit which transmits the depressed states of the keys to the exchange.

3 Claims, 5 Drawing Sheets

| Failure name | Detection position | Category | Level of importance | Outside notification | Terminal notification | Alarm key type |
|---|---|---|---|---|---|---|
| Circuit board failure | any | Circuit board | Major | On | On | 1 |
| ISDN LOS | any | Line | Major | On | On | 1 |
| ISDN AIS | any | Line | Minor | On | Off | – |
| any | any | any | Major | On | On | 2 |
| any | any | Line | any | On | On | 3 |
| any | Port 1 | any | any | On | On | 4 |
| ⋮ | ⋮ | ⋮ | ⋮ | ⋮ | ⋮ | ⋮ |

FIG. 2

| Failure name | Detection position | Category | Level of importance |
|---|---|---|---|
| Circuit board failure | Slot 2 | Circuit board | Major |
| ISDN LOS | Port 1 | Line | Major |
| ⋮ | ⋮ | ⋮ | ⋮ |

FIG. 3

| Telephone terminal DN | Function key number | Alarm key type |
|---|---|---|
| 2000 | FK10 | 1 |
| 2001 | – | – |
| 2002 | FK10 | 1 |
| ⋮ | ⋮ | ⋮ |

EXCHANGE SYSTEM, BUTTON TELEPHONE SET AND EXCHANGE

CROSS-REFERENCE TO RELATED APPLICATIONS

This application is based upon and claims the benefit of priority from Japanese Patent Application No. 2005-189983, filed Jun. 29, 2005, the entire contents of which are incorporated herein by reference.

BACKGROUND

1. Field

One embodiment of the invention relates to an exchange system formed as a private branch telephone system, a button telephone set, and an exchange.

2. Description of the Related Art

An existing exchange system has a function of notifying an operator the fact that a failure has occurred in the system. Its representative methods are as follows:

(1) An exchange and a circuit board are provided with light emitted diodes (LEDs) to light the LEDs or blink them in the occurrence of the failure
(2) The failure information is notified to network management equipment via a local area network (LAN)
(3) An e-mail notifying the occurrence of the failure is sent to a prescribed e-mail address via the LAN
(4) The failure is notified to the operator by making a call to a prescribed telephone number via a public telephone line.

The method described in the above (1) is effective in shortening a time of maintenance work for replacing the circuit board with the failure and checking a line. The methods described in the above (2)-(4) are utilized for the purpose of remote maintenance and centralized managements and effective in shortening a time from an occurrence of a failure up to a start of maintenance work. As described above, the existing system fully prepares a failure notification function to the operator.

In contrast, the existing system does not fully prepare a function of notifying the occurrence of the failure to a user of a telephone terminal. Although a solution of this defect has been exemplified in Japanese Patent Application KOKAI Publication No. 7-95638, even the exemplified technique cannot notify the occurrence of the failure to the user immediately. Furthermore, in the case of absence of the network management equipment in a small scale office, etc., and under an environment in which any external connection via the LAN is not established, a failure notification is not put into practice appropriately. As mentioned above, each existing exchange system does not have an enough failure notification function to the user and desires to do something therefore.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary view showing an example of a table T1 of notification destinations for each failure;

FIG. 3 is an exemplary view showing an example of a failure information table T2;

FIG. 4 is an exemplary view showing an example of a alarm key table T3;

DETAILED DESCRIPTION

Various embodiments according to the invention will be described hereinafter with reference to the accompanying drawings.

Figure 1:
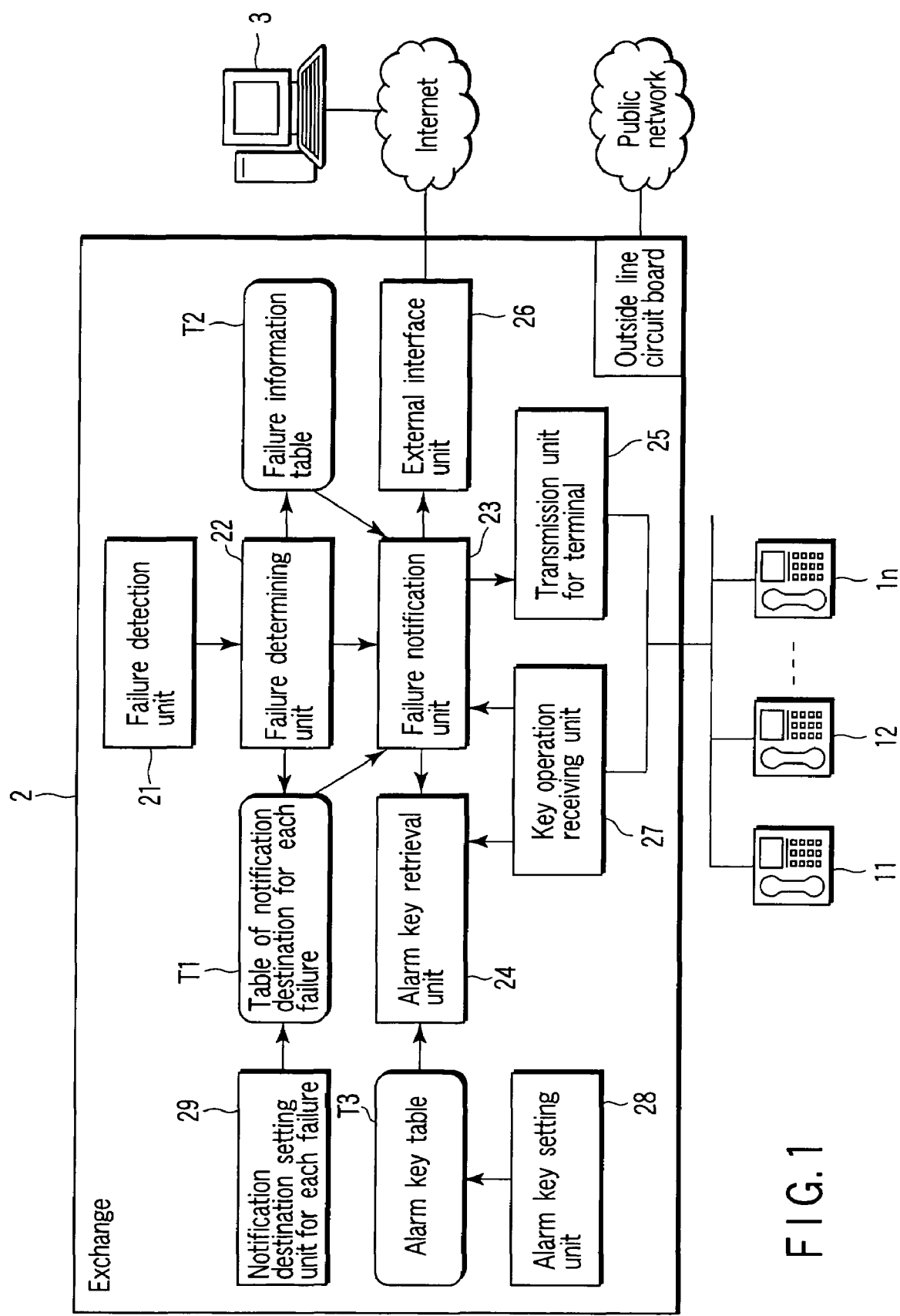
FIG. 1 is an exemplary view showing an embodiment of en exchange system regarding the present invention.

FIG. 1 is the exemplary view showing the embodiment of the exchange system regarding the present invention. The exchange system formed mainly of an exchange 2 and telephone terminals 11-1$n$ housed in the exchange 2 via a communication line. The exchange 2 is connected to a public network through an outside line circuit board to exchange-connect the telephone terminals 11-1$n$ with the public network. The exchange 2 is connected to network management equipment 3 via a local area network (LAN) or the Internet.

A failure detection unit 21 of the exchange 2 detects a circuit board trouble, a power disconnection and a failure in a line error, etc., in the exchange system to notify failure detailed information (failure type, detection position, etc.) to a failure determining unit 22. The failure determining unit 22 determines whether or not the failure is to be notified on the basis of the failure detailed information notified from the failure detection unit 21 with reference to a table T1 of notification destinations for each failure.

FIG. 2 is the exemplary view showing the example of the table T1 of the notice destinations for each failure. In FIG. 2, a failure of "On" of an outside notification is notified to the network management equipment 3. A failure of "On" of a terminal notification is notified to a set telephone terminal. For instance, in the exchange system, it is set that an ISDN alarm indication signal (AIS) is notified to the management equipment 3; however, it is not notified to the telephone terminals 11-1$n$.

Changing contents of the table T1 make it possible to change setting for notify destinations for each failure. To change the contents of the table T1, in a data setting mode, the exchange system starts up a notification destination setting unit for each failure 29 through the management equipment 3 or the telephone terminals 11-1$n$. The setting unit 29 provides a user interface and enables changing the contents of the table T1.

When determining that the detected failure is to be notified, the determining unit 22 stores the failure detailed information in a failure information table T2 shown in FIG. 3, and notifies a failure identifier and notification destination information to a failure notification unit 23. Detailed information such as the detection positions, categories and levels of importance, etc., is recorded in the table in FIG. 3 by associating the detailed information with failure names.

When receiving the notification from the determination unit 22, the notification unit 23 determines whether or not the failure notification destinations are the network management equipment 3, the telephone terminals 11-1$n$ or both of them on the basis of the table T1. If the notice destination is the management equipment 3, the notification unit 23 reads out the failure detailed information from the failure information table T2 to notify it to the management equipment 3 via an external interface unit 26. If the notification destinations are the telephone terminals 11-1n, the notification unit 23 acquires positions of the notification destination telephone terminals and their function keys through an alarm key retrieval unit 24 to transmit LED control information to the notification destination telephone terminals via a transmission unit for terminals 25. This LED control information includes function key positions and control types (turning on light/blinking light/turning off light).

Furthermore, a key operation receiving unit 27 in FIG. 1 receives key operation information of telephone terminals from the telephone terminals 11-1n. The key operation information includes identifiers of the telephone terminals 11-1n, identifiers of the keys and information if the keys have been depressed or released. The receiving unit 27 further checks whether or not the key identifiers received through the retrieval unit 24 are the function keys with the alarm keys assigned thereto, respectively. As a result, if it is determined that any alarm key has been depressed, the receiving unit 27 notifies the fact to the notification unit 23.

The notification unit 23 received the notification from the receiving unit 27 acquires failure detailed information corresponding to the alarm key from the tables T2 and T1. The notification unit 23 then processes the failure detailed information for an LCD display of the telephone terminal to generate the LCD control information. This LCD control information is transmitted from the transmission unit 25 for the telephone terminals of which the alarm keys have been pressed.

An alarm key setting unit 28 is activated by the data setting mode through the management equipment 3 or the telephone terminals 11-1n to change the contents of an alarm key table T3. FIG. 4 shows the example of the alarm key table T3. The alarm key table T3 stores dial numbers (DNs) of the telephone terminals 11-1n by associating numbers of the function keys and the types of the alarm keys with the telephone terminals 11-1n. In FIG. 4, for instance, an alarm key of type 1 is assigned to the 10th function key of the telephone terminal of a DN of 2000 [hereinafter, written as telephone terminal (DN 2000)].

The retrieval unit 24 retrieves the alarm key table T3 in response to a request from the notification unit 23 to reply, all of the identifiers of the telephone terminals 11-1n and positions of the function keys to which the alarm keys of a specified alarm key type, to the notification unit 23. The retrieval unit 24 determines whether or not the key of the specified telephone terminal is the alarm key on the basis of the alarm key table T3 to return the determination result to the receiving unit 27.

Figure 5:
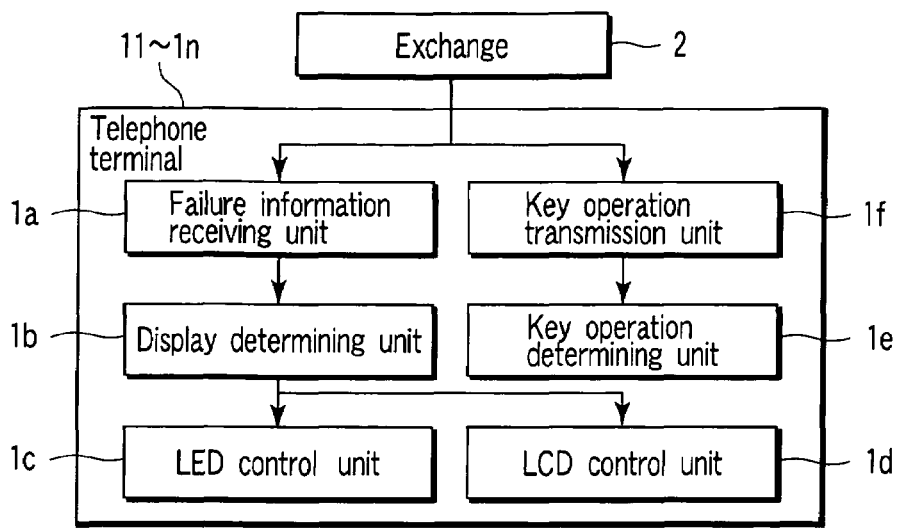
FIG. 5 is an exemplary functional block diagram of telephone terminals 11-1$n$ in FIG. 1.

FIG. 5 is the exemplary functional block diagram of the telephone terminals 11-1n in FIG. 1. Each telephone terminal 11-1n is provided with a plurality of function keys with light emitting devices such as light emitting diodes (LEDs) and display devices such as liquid crystal displays (LCDs) and achieved as so-called button telephone sets, respectively. In FIG. 5, a failure information receiving unit 1a receives LED control information or LCD control information from the transmission unit for terminal 25 of the exchange 2 to notify it to a display determining unit 1b. The display determining unit 1b performs the control (turning on light/blinking light/turning off light) specified to the LED of the specified function key through an LED control unit 1c if the received information has been the LED control information. If the received information has been the LCD control information, the determining unit 1b displays the specified characters on the LCD through an LCD control unit 1d. A key operation determining unit 1e detects depressed states of all keys of the telephone terminal and, if those states vary, transmits the identifiers and the depressed states of the keys to the exchange 2 via a key operation transmission unit 1f.

Next, operations in the above-described configuration will be described. The flow of processes in the embodiment can be classified mainly into situations of the occurrence of the failure, the key operations by the users of the telephone terminals and the recovery of the failure.

Figure 6:
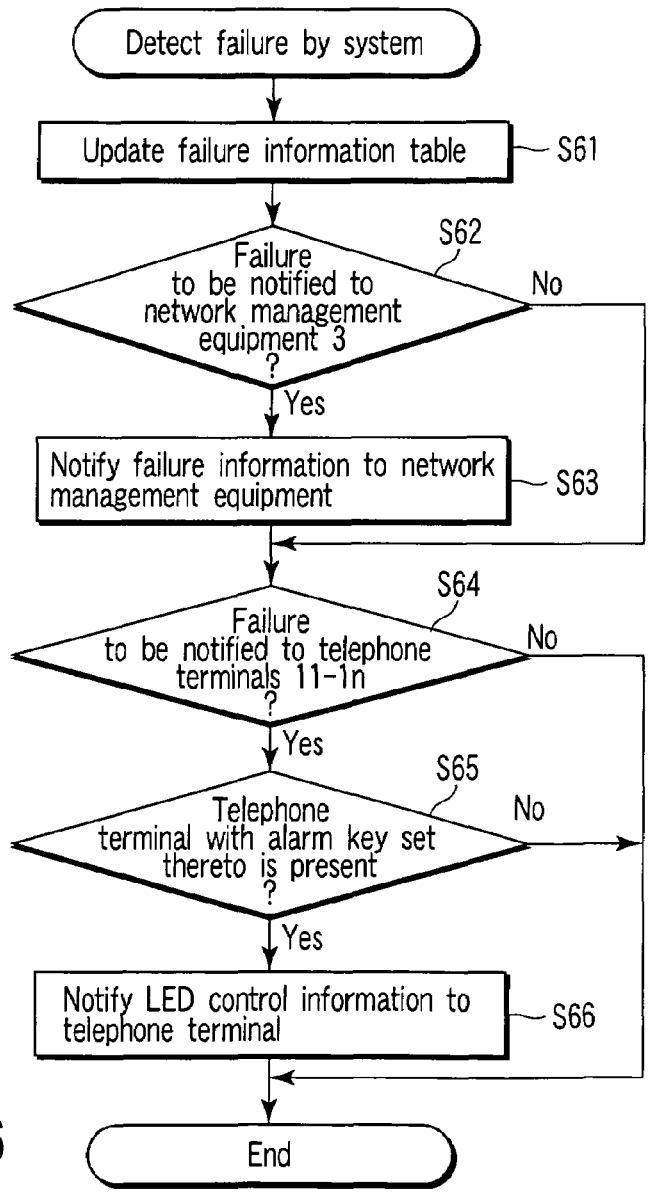
FIG. 6 is an exemplary flowchart for explaining a flow in occurring a failure in an embodiment of the invention.

FIG. 6 is the exemplary flowchart for explaining the flow of the occurrence of the failure. In FIG. 6, it is presumed that the exchange 2 detects a failure of a failure name "ISDN LOS". After this, the exchange 2 updates the table T2 (step S61) and determines the notification destination of the failure information by referring to the table T1 (step S62). If the contents of the table T1 are those shown in FIG. 3, the exchange 2 notifies the failure to the network management equipment 3 and the telephone terminals (of alarm key type 1) (Yes, in step S62). The exchange 2 firstly notifies the failure information to the prescribed management equipment 3 (step S63). Also in the next step, the exchange 2 determines that the failure is one to be noticed to the telephone terminals (of alarm key type 1) (Yes, in step S64).

The exchange 2 then refers to the alarm key table T3 before notifying the failure to the telephone terminals 11-1n to determine the telephone terminals to be notified the failure (step S65). If the contents of the alarm key table T3 are those shown in FIG. 5, it becomes clear that the telephone terminal (DN 2000) and the telephone terminal (DN 2002) are set to the alarm key type 1. The exchange 2 then notifies the LED control information to turn on the LEDs of the alarm keys to these telephone terminals (step S66). The telephone terminals (DN 2000) and (DN 2002) have received this LED control information turn on the LEDs of the function keys assigned to the alarm keys, respectively. The user of these telephone terminals thereby can know the occurrence of the failure in the exchange system arbitrarily.

Figure 7:
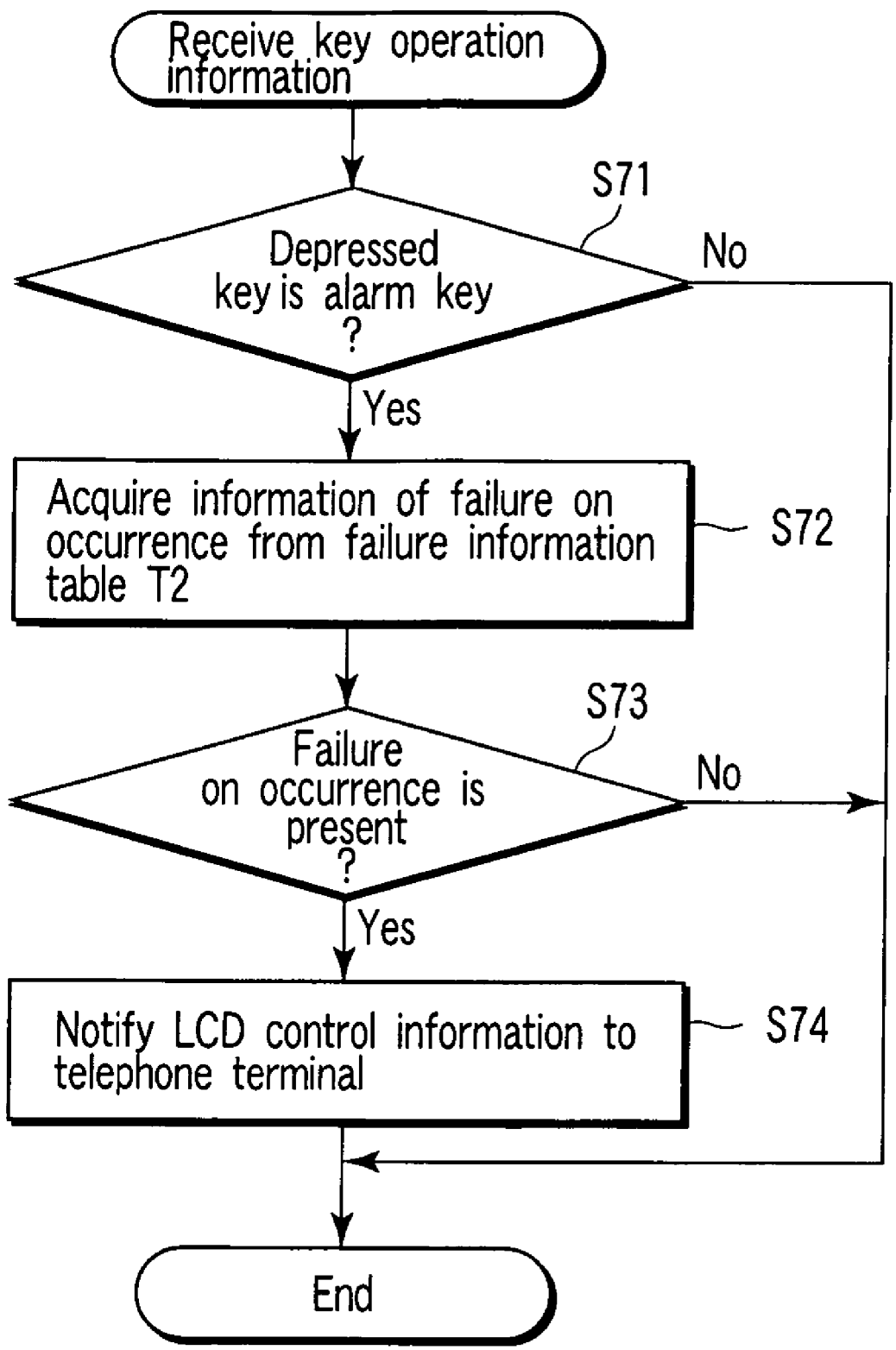
FIG. 7 is an exemplary flowchart showing a process procedure in depressing alarm keys of the telephone terminals 11-1$n$.

Next to this, the flow of the process when the user of the telephone terminal operates the alarm key will be explained with reference to FIG. 7. In FIG. 7, when the user depresses the alarm key (function key) of the telephone terminal, the telephone terminal transmits the key operation information to the exchange 2. The exchange 2 which has received this key operation information refers to the alarm key table T3 to confirm whether the operated function key is the alarm key or not (step S71). If the contents of the alarm key table T3 is shown like FIG. 5, when the key control information indicating that a function number FK 10 has been operated by the telephone terminal (DN 2000) is notified, it is determined that the operated function key is the alarm key belonging to the type 1.

Since it is determined that the operated key is the alarm key of the type 1, the exchange 2 acquires detailed information, relating to a failure being on occurrence, to be notified to the alarm key of the type 1 from the failure information table T2 and from the table T1 of the notification destinations for each failure (step S72). If it is determined that the failure on current occurrence in accordance with the acquired information (Yes, in step S73), the exchange 2 data-converts the acquired information into LCD display information ("ISDN LOS, PORT 1", for example). The exchange 2 notifies the LCD control information including the LCD display information to the telephone terminal (DN 2000) that is the communication origin of the key operation information (step S74). The telephone terminal (DN 2000) which has received the LCD control information displays the character information indicating the failure information data onto the LCD.

Figure 8:
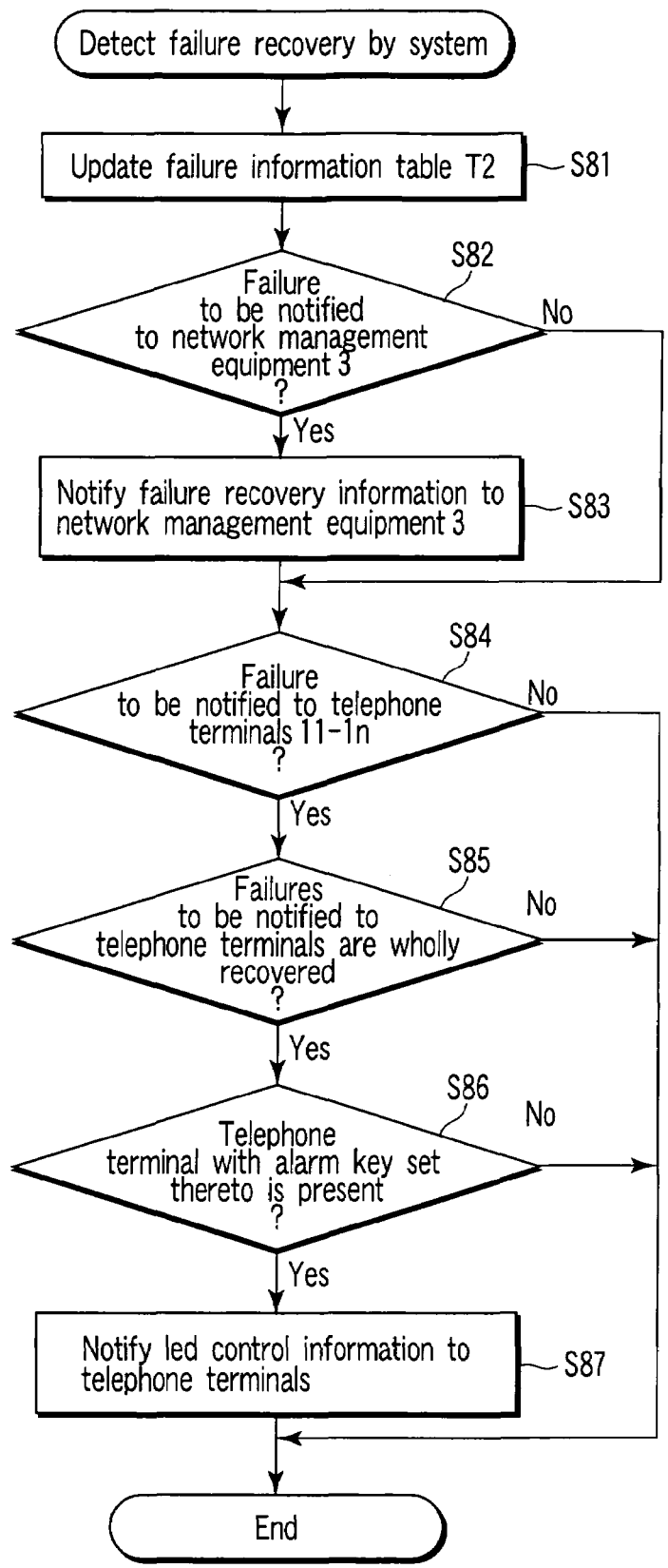
FIG. 8 is an exemplary flowchart showing a press procedure in recovering the failure.

With reference to the flow in recovering the failure illustrated in FIG. 8, it is supposed that the exchange 2 has detected, for instance, the recovery of the "ISDN LOS". The exchange 2 then instantaneously updates the failure information table T2 (step S81) then determines the notification destination of the failure recovery by referring to the table T1 (step S82). If the contents in the table T1 are those shown in FIG. 3, the exchange 2 has to notify the failure information to both management equipment 3 and telephone terminal. The exchange 2 firstly notifies LOS failure recovery information to the management equipment 3 (step S83).

Subsequently, the exchange 2 refers the alarm key table T2 and the table T1 to determine the telephone terminal of the notification destination for the failure recovery (step S84). If all failures, that are targets of notification to the telephone terminals (of alarm key type 1) determined in the step S84, have been recovered (Yes, in step S85), the exchange 2 refers to the alarm key table T3 to determine the presence/absence of the telephone terminals of which the alarm keys have been set, respectively (step S86). Here, the telephone terminals (DN 2000) and (DN 2002) are detected and the LED control information to extinguish the LEDs of the alarm keys is notified to the telephone terminals (DN 2000) and (DN 2002) (step S87). The telephone terminals (DN 2000) and (DN 2002) which have received this LED control information extinguish the LEDs of the function keys assigned to the alarm keys. With such operations, the users of the telephone terminals come to know the failure recoveries in the exchange system appropriately. In the case of the occurrences of a plurality of failures, the exchange system is configured to display coming failure information onto the LCDs of the telephone terminals at every time when the user of the telephone terminals depress the alarm keys or differently assigned function keys.

As mentioned above, according to the embodiment, when any failure has occurred in the exchange system, the occurrence of the failure is notified not only to the network management equipment 3 but also to the telephone terminals 11-1n. Thereby, the users of the telephone terminals 11-1n can know the occurrence of the failure directly. Therefore, even in the case of the small scale system in which the management equipment 3 is not installed, the system can shorten the time needed to start its maintenance work. Further, by locating an IP telephone terminal which has been prevailed recently at a distance place, as an extension terminal, and providing an alarm key to the IP telephone terminal, it becomes possible to replace the IP telephone terminal with the management equipment 3.

The present invention is not limited to the aforementioned embodiment. For instance, it may be acceptable that the user of the telephone terminal turns off the LED display of the alarm key by entering the specified number or depressing the specified function key after the user observed the failure information in accordance with the LCD display. Thereby, the user can solve such a troublesome matter that the LED keeps its display after the confirmation of the failure by the user.

It is also acceptable to assign the alarm keys to a plurality of function keys for each level of importance of the failure information (Major/Minor/Warning, for example). The user of the telephone terminal thereby can expeditiously know the level of the importance of the failure that has occurred. Furthermore, it is also possible to change a blinking speed and light emission color of the LED of the alarm key for each level of importance. Especially, in the case of a failure with a high level of importance, the exchange system may ring a bell of a telephone terminal of which the alarm key is set to notify the occurrence of the failure to the user of the telephone terminal.

Further, the exchange system may assign the alarm keys to the plurality of function keys at every category (for example, circuit board failure/line failure/software failure) of the failure information. The user of the telephone terminal can immediately know the category of the failure that has occurred. Furthermore, it is functional to change blinking speeds and light emission color of the LEDs of the alarm keys for each category.

Still more, it is possible to assign the alarm keys to the plurality of function keys for each failure detection position (line number, circuit board location, etc.). The user of the telephone set thereby can expeditiously know the occurrence position of the failure. For instance, when a plurality of tenants share one exchange system, only the failures related to the tenants with telephone terminals belonged thereto can be displayed on the alarm keys. Moreover, it is also acceptable to change blinking speeds and light emission color of the LEDs of the alarm keys at every failure detection position.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An exchange system which includes a plurality of button telephone sets having a plurality of function keys equipped with light emitting device, respectively, and an exchange to house the button telephone sets via a communication line, wherein the exchange comprises:

a failure detection unit which detects failures in the exchange system;

a failure information table which stores detailed information on the failures detected by the failure detection unit;

a table of notification destinations for each failure, which stores notification destinations of the detected failures;

a failure determining unit which determines the notification destinations of the detected failures by referring to the table of the notification destination for each failure;

a first alarm key table in which the function keys are associated with the respective button telephone sets for each type of the failures;

an alarm key retrieval unit which retrieves positions of the function keys displaying failure states from the first alarm key table in response to the button telephone sets of the failure notification destinations;

a failure notification unit which notifies the failures to the button telephone sets;

a transmission unit which transmits data from the failure notification unit to the button telephone sets of the failure notification destinations;

a key operation receiving unit which receives key operation information from the button telephone sets to transfer the key operation information to a first alarm key setting unit and the failure notification unit;

a second alarm key setting unit which assigns alarm keys displaying the failure states onto specified function keys of specified button telephone sets on the basis of the information received from the key operation receiving units; and a second alarm key table which stores the assignment of the alarm keys, and wherein each of the button telephone sets comprises:

a display device to display character information;

a failure information receiving unit to receive data from a transmission unit for button telephone sets of the exchange;

a display determining unit to determine display types of the function keys from types of the received data;

a light emitting device control unit to display-controlling light emitting devices of the corresponding function keys in response to an instruction from the display determining unit;

a display device control unit to perform a data display onto the display device in accordance with the instruction from the display determining unit;

a key operation determining unit to determine depressed states of keys of the button telephone sets including the function keys; and a key operation transmission unit to transmit the depressed states of the keys to the exchange.

2. A button telephone set, a plurality of button telephone sets which are housed in an exchange via a communication line and which are installed in an exchange system, comprising:

a plurality of function keys equipped with light emitting devices, respectively;

a display device which displays character information;

a failure information receiving unit which receives data notified from the exchange;

a display determining unit which determines display types of the function keys from types of the received data;

a light emitting device control unit which display-controls the light emitting devices of the corresponding function keys in response to an instruction from the display determining unit;

a display device control unit which performs a data display onto the display device in accordance with the instruction from the display determining unit;

a key operation determining unit which determines depressed states of keys of the button telephone sets including the function keys; and a key operation transmission unit which transmits the depressed states of the keys to the exchange.

3. An exchange, which is installed in an exchange system to include a plurality of button telephone sets having a plurality of function keys equipped with light emitting devices, respectively, and to house the button telephone sets therein, the exchange comprising:

a failure detection unit which detects failures in the exchange system;

a failure information table which stores detailed information on the failures detected by the failure detection unit;

a table of notification destinations for each failure, which stores notification destinations of the detected failures;

a failure determining unit which determines the notification destinations of the detected failures by referring to the table of the notification destinations for each failure;

a first alarm key table in which the function keys are associated with the respective button telephone sets for each type of the failures;

an alarm key retrieval unit which retrieves positions of the function keys displaying failure states from the first alarm key table in response to the button telephone sets of the failure notification destinations;

a failure notifying unit which notifies the failures to the button telephone sets;

a transmission unit which transmits data from the failure notification unit to the button telephone sets of the failure notification destinations;

a key operation receiving unit which receives key operation information from the button telephone sets to transfer the key operation information to a first alarm key setting unit and the failure notification unit;

a second alarm key setting unit which assigns alarm keys displaying the failure states onto specified function keys of specified button telephone sets on the basis of the information received from the key operation receiving units; and a second alarm key table which stores the assignment of the alarm keys.

* * * * *